United States Patent [19]

Roch et al.

[11] 4,385,446

[45] May 31, 1983

[54] PISTOL-GRIP INSTRUMENT FOR MEASUREMENT OF INSIDE DIAMETERS

[75] Inventors: Charles Roch, Rolle; Louis C. Golay, Neuchatel, both of Switzerland

[73] Assignee: Piere Roch S.a.r.l., Rolle, Switzerland

[21] Appl. No.: 223,740

[22] Filed: Jan. 9, 1981

[30] Foreign Application Priority Data

Feb. 8, 1980 [CH] Switzerland ............... 1050/80
Apr. 21, 1980 [CH] Switzerland ............... 3069/80

[51] Int. Cl.³ ............................................. G01B 5/12
[52] U.S. Cl. .......................... 33/178 R; 33/147 F; 33/147 K
[58] Field of Search ........... 33/147 F, 147 K, 178 R, 33/178 E

[56] References Cited

U.S. PATENT DOCUMENTS

| | | | |
|---|---|---|---|
| 2,454,246 | 11/1948 | Worthen | 33/147 K |
| 3,316,650 | 5/1967 | Aldeborgh et al. | 33/178 R |
| 3,418,720 | 12/1968 | Worthen | 33/147 K |
| 3,995,374 | 12/1976 | Fisk | 33/178 R |
| 4,045,877 | 9/1977 | Rutter | 33/178 R |
| 4,172,325 | 10/1979 | Lendi et al. | 33/178 E |
| 4,288,925 | 9/1981 | Mizuno et al. | 33/178 R |

Primary Examiner—Richard R. Stearns
Attorney, Agent, or Firm—Trexler, Bushnell & Wolters, Ltd.

[57] ABSTRACT

The measurement feelers (15) are operated by a movable member consisting of a rod (17) which is movable axially and upon which can slide a cylinder (11a) subjected to the action of a main spring (13) which forces it towards its position of bearing against a stop (19) integral with the rod (7a). This rod is furthermore under the influence of a secondary spring (16) which is weaker and acts in the opposite sense to the main spring. The trigger (17) which enables the cylinder (11a) to be acted upon may be actuated as far as the end of its travel without the rod (6) of the comparator attached to the body (1,2) of the instrument ever undergoing a thrust stronger that the force of the secondary spring (16). Thus the disadvantage is avoided of direct action of the trigger upon the portion of the movable member which enters into action against the feeler (10) of the comparator and consequently can cause the slipping of this rod in the tightener bush (4) and resultant errors in reading.

5 Claims, 6 Drawing Figures

PISTOL-GRIP INSTRUMENT FOR MEASUREMENT OF INSIDE DIAMETERS

Pistol-grip instruments are already known for the measurement of inside diameters, which comprise a body provided with means of attachment for fitting a comparator onto this body. These known instruments further comprise a member which is movable axially in this body and one end of which is arranged to operate measurement feelers movable radially with respect to this member, whilst the other end of this member is designed to act upon the feeler of a comparator previously fitted to the said body. In these known instruments a main spring is arranged in this body in order to tend to act upon this member in the direction in which the member forces the feelers to project from the body of the instrument. Moveover a secondary spring is provided, which is weaker than the main spring and which is arranged in the body in order to act in the opposite direction to the main spring in order to make these feelers retract when the main spring is prevented from acting upon them. Finally, these known instruments comprise a trigger for acting upon this member in order to make the main spring cease from acting upon the feelers.

These known instruments have, however, the defect that the position of the trigger for which the measurement feelers are completely retracted is not the end-of-travel position of this trigger. The result is that if the user acts too strongly upon the trigger it overruns this normal end-of-travel position, which causes a presure by the trigger against a portion of the movable member which transmits it to the comparator. Since electronic comparators are more and more often employed, the rod of which is weak and which consequently cannot be stopped forcibly against the body of the instrument, this too forcible action against the trigger causes a recoil of the rod of the comparator inside the body of the instrument, of which the operator is not in general aware but which completely falsifies the ultimate readings. This same defect may appear when mechanical comparators are employed, if the latter are not attached by very strong clamping onto the body of the instrument.

The present invention cures this defect. The object of it is a measuring instrument in accordance with Claim 1.

The attached drawing represents by way of example two embodiments of the instrument in accordance with the invention.

Figure 1:
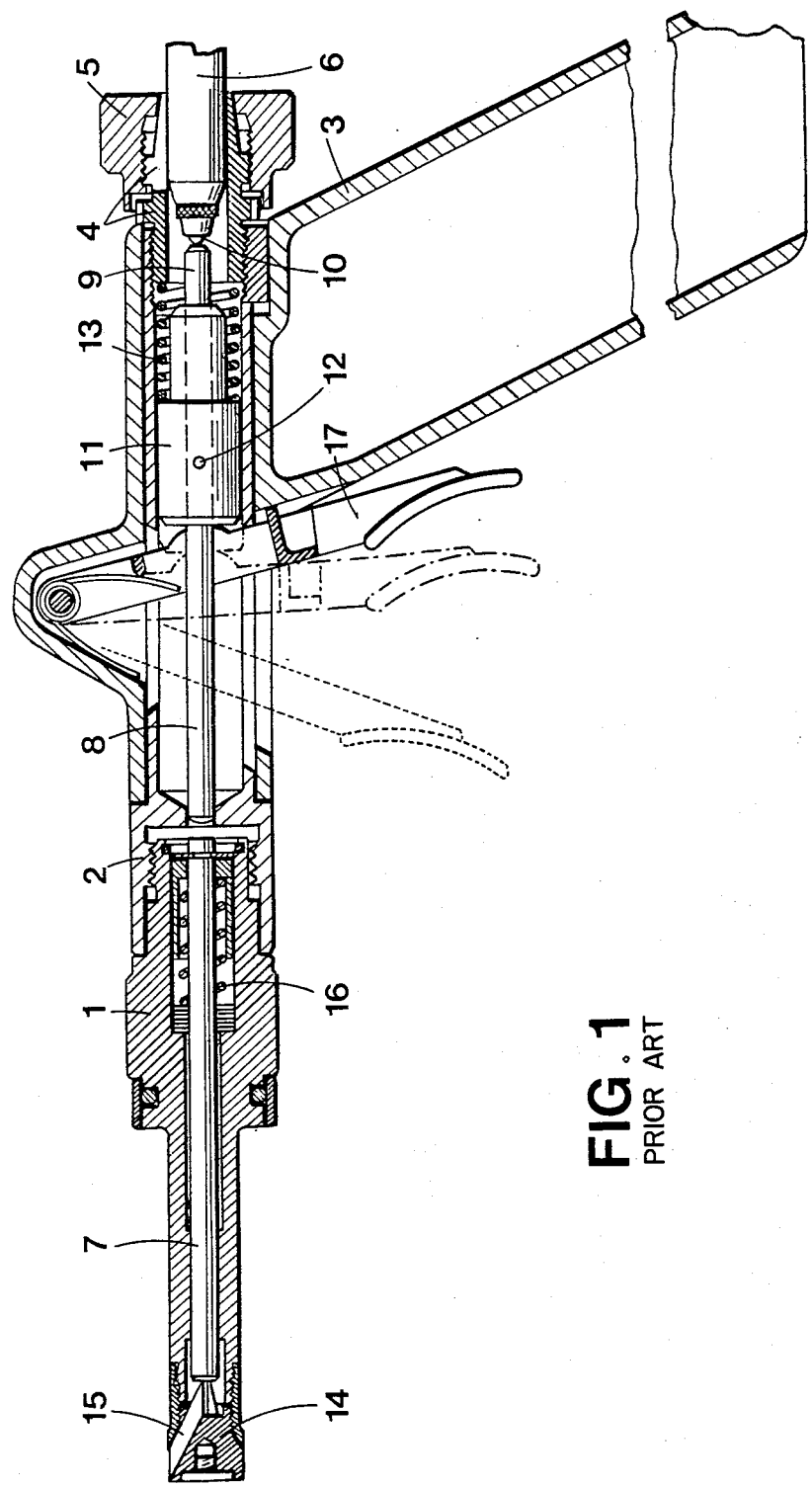
FIG. 1 is a diagrammatic axial section of an instrument of known type, having a pistol-grip, for the measurement of inside diameters.

In FIG. 1 the body of the instrument is formed of a part 1, of a part 2 screwed onto the part 1 and of a grip 3 attached to the part 2. Clamping means comprising a split bush 4 and a clamping nut 5 serve for attaching the rod 6 of a comparator to the inside of the body 1,2, 3. Inside the body there is a movable member formed of a cylindrical rod 7 which can slide axially inside the part 1, of another cylindrical rod 8 arranged in order to make contact with the righthand end of the rod 7, this rod 8 being co-axial with 7. This rod 8 is intended to act by the end of it at the right in the drawing, designated by 9, upon the measurement feeler 10 of the comparator 6. A cylindrical thrust-piece 11 is attached to the rod 8 by means of a pin 12. A main spring 13 is arranged inside the part 2 round the portion of the rod 8 located at the right of the part 11 upon which it acts by one end of it, whilst it bears by its other end against a fixed portion of the body of the instrument, consisting in this example of the clamping bush 4.

At the end on the left in the drawing, there is attached to the part 1 a measurement head 14 comprising three feelers such as 15 which serve for the measurement of inside diameters. The left hand end of the rod 7 is in contact with these feelers which the spring 13 tends to to make project from the head 14. A secondary spring 16 is arranged in the part 1 in order to act upon the rod 7 in the opposite direction to the spring 13. This secondary spring 16 is substantially weaker than the main spring 13 but substantially stronger than the spring of the comparator 6 which tends to make the feelers 10 project.

A trigger 17 is hinged onto the portion 3 and serves to act upon the part 11 against the action of the spring 13 in order to withdraw the feelers 15 from the action of this spring. In the position shown in dotted line the trigger 17 is in the position of rest, that is to say, in its extreme lefthand position where it is held by the spring 13. The feelers 15 then project to a maximum from the measurement head 14. In the position shown in dash/-dot line the trigger 17 is occupying the position in which the feelers 15 are just retracted inside the head 14. The position of the trigger 17 shown in solid line is the end-of-travel position of this trigger. In passing from the position in dash/dot line to the position in solid line the trigger 17 has therefore acted upon the feeler 10 of the comparator 6 by way of the part 11 and of the end portion 9 of the rod 8 strongly enough for this rod of the comparator 6 to have slid inside the clamping bush 4. Consequently the ultimate indications of the comparator will be false, which is the disadvantage which the invention precisely aims at eliminating.

The parts being shown in the extreme righthand position of the trigger, the rods 7 and 8 are no longer making contact. Of course between the position of the trigger 17 shown in dotted line and the position in dash/dot line the rods 7 and 8 are touching. The amount by which these two rods are separated represents precisely the displacement which may be inflicted upon the rod 6 of the comparator if one acts with an excessive force upon the trigger 17.

Figure 2:
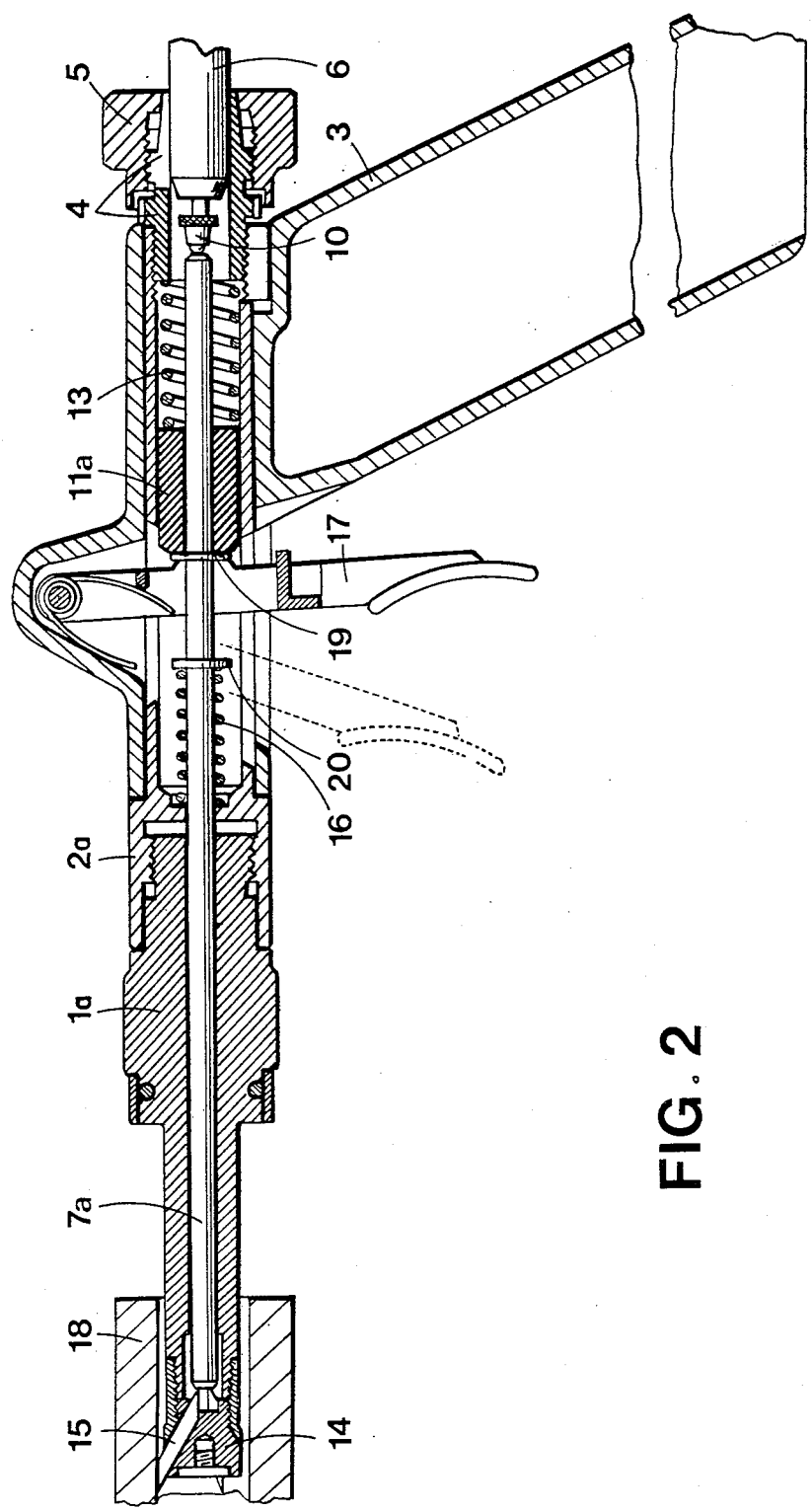
FIG. 2 is an axial section of the embodiment of the instrument in accordance with the invention, showing the parts in the normal position for measurement.
Figure 3:
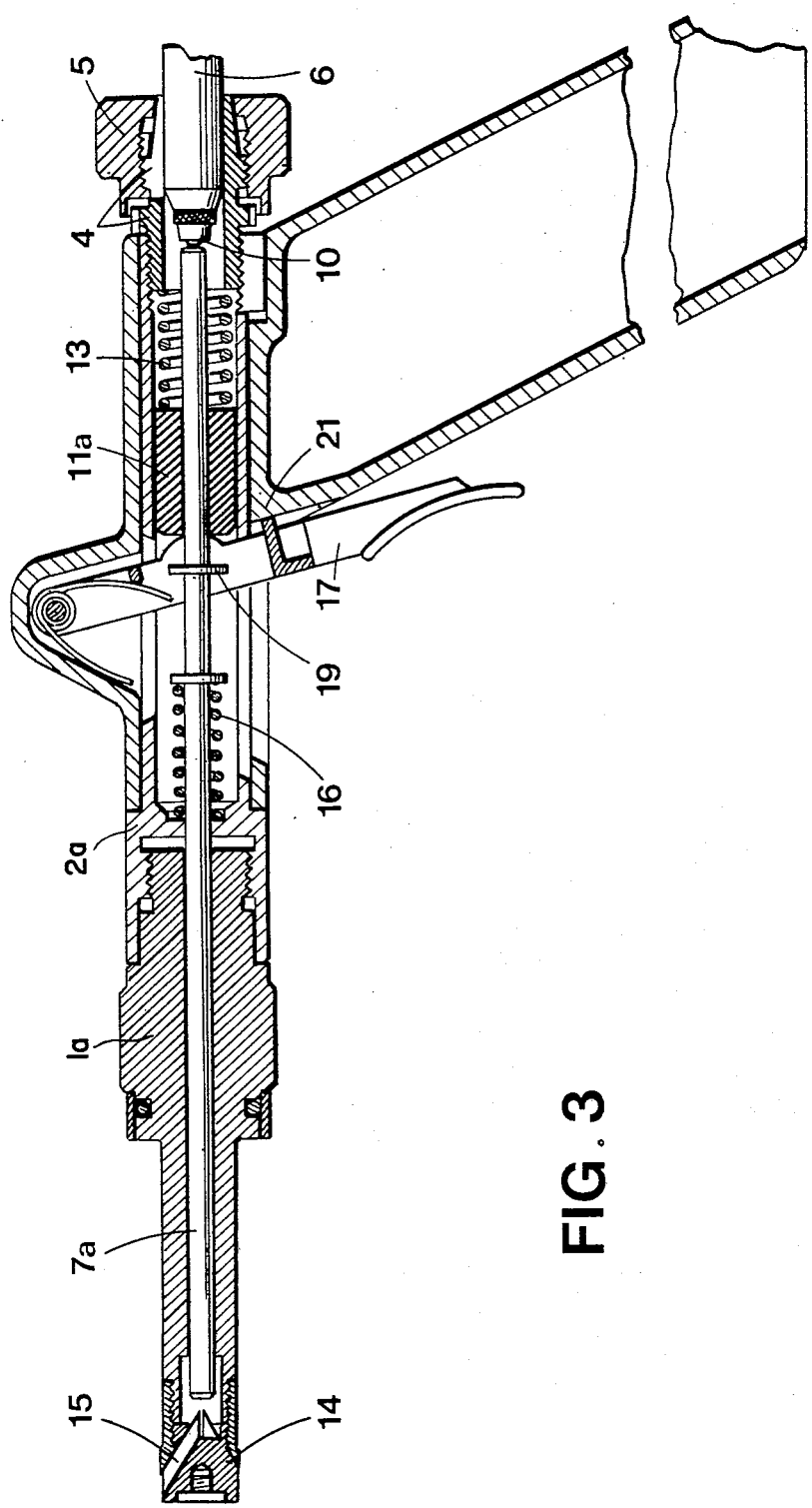
FIG. 3 is a view similar to FIG. 2 but showing the position which these parts occupy when the trigger is being acted upon in order to bring it to the end of its travel.

In the embodiment of the instrument represented in FIGS. 2 and 3, the portions identical with those of FIG. 1 have been designated by the same reference numbers, while similar parts have like reference numbers with addition of the suffix a. In FIG. 2 are seen at 15 the feelers projecting by a certain amount from the measurement head 14 and having come into contact with the bore of a part 18 of which it is a question of measuring the inside diameter.

In this embodiment the movable member is formed simply by a cylindrical rod 7a which can be displaced axially inside the portions 1a,2a of the body of the instrument, this rod 7a acting by its lefthand end upon the feelers 15 and being intended to make contact by its righthand end with the feeler 10 of the comparator the rod of which is seen at 6. This movable member comprises a part 11a similar to 11 in FIG. 1 but mounted in order to slide freely on the rod 7a. A circlip 19 is fixed onto the rod 7a in order to limit the displacement towards the left of the part 11a on the rod 7a under the action of the main spring 13. The secondary spring 16 bears against a spring seat in the part 2d and acts against a circlip 20 fixed onto the rod 7a. The position of the trigger 17 represented in dotted line is the position of rest. The position represented in solid line is the position for measurement. If the trigger is displaced further towards the right a time arrives when the feelers 15 are completely retracted into the head 14 and if one goes still further up to the time when the trigger 17 butts against the portion 21 of the grip as is seen in FIG. 3, the feelers 15 are completely retracted into the head 14 and the rod 7a is no longer making contact with them. This rod cannot however act upon the rod 6 of the comparator with a force sufficient to make it slide inside the clamping bush 4. That is, from the instant when one has gone beyond the completely retracted position of the feelers 15 and one continues to act upon the trigger in order to push it towards the right in the drawing, the trigger pushes the cylindrical part 11a towards the right but this part being free on the rod 7a, right from the end of travel of the feeler 10 it leaves contact with the circlip 19 and further compresses the spring 13, which has no disadvantage. Consequently the only force with which the part 7a acts upon the feeler 10 is the force of the secondary spring 16 which in itself is sufficiently weak not to cause the disadvantage indicated at the beginning.

The respective forces of the springs coming into play here are for example 1, to 3 kg for the spring 13, 300 g for the secondary spring 16 and 200 g for the restoring force of the comparator acting upon the feeler 10. These indications show that the defect indicated in known instruments is completely avoided.

Of course the rod 7a could be made not in only one member as is ordinarily the case, in particular in FIG. 1, but the operation would remain essentially the same since the part 11 is movable with respect to the part 7a.

In spite of its advantages, the construction which has just been described may in certain cases display a defect which it is desirable to eliminate. This defect consists in the fact that when, after having brought the trigger 17 into the extreme working position represented in solid line in FIG. 2, one releases this trigger abruptly, the spring 13 being relatively strong can drive the part 11a and with it the rod 7a so that the latter comes and strikes violently the tail of the feelers 15, which has two disadvantages. First of all, the feelers are pushed violently outwards and may be their measurement ends damage the surface of the bore to be measured. Furthermore, under the effect of the shock of the rod 7a against these feelers, this rod may rebound in the opposite direction and come and strike violently the feeler 10, which may bring about slipping of the rod 6 of the comparator in the bush 4 and falsify the measurements as has already been explained in relation to FIG. 1.

Figures 4, 5:
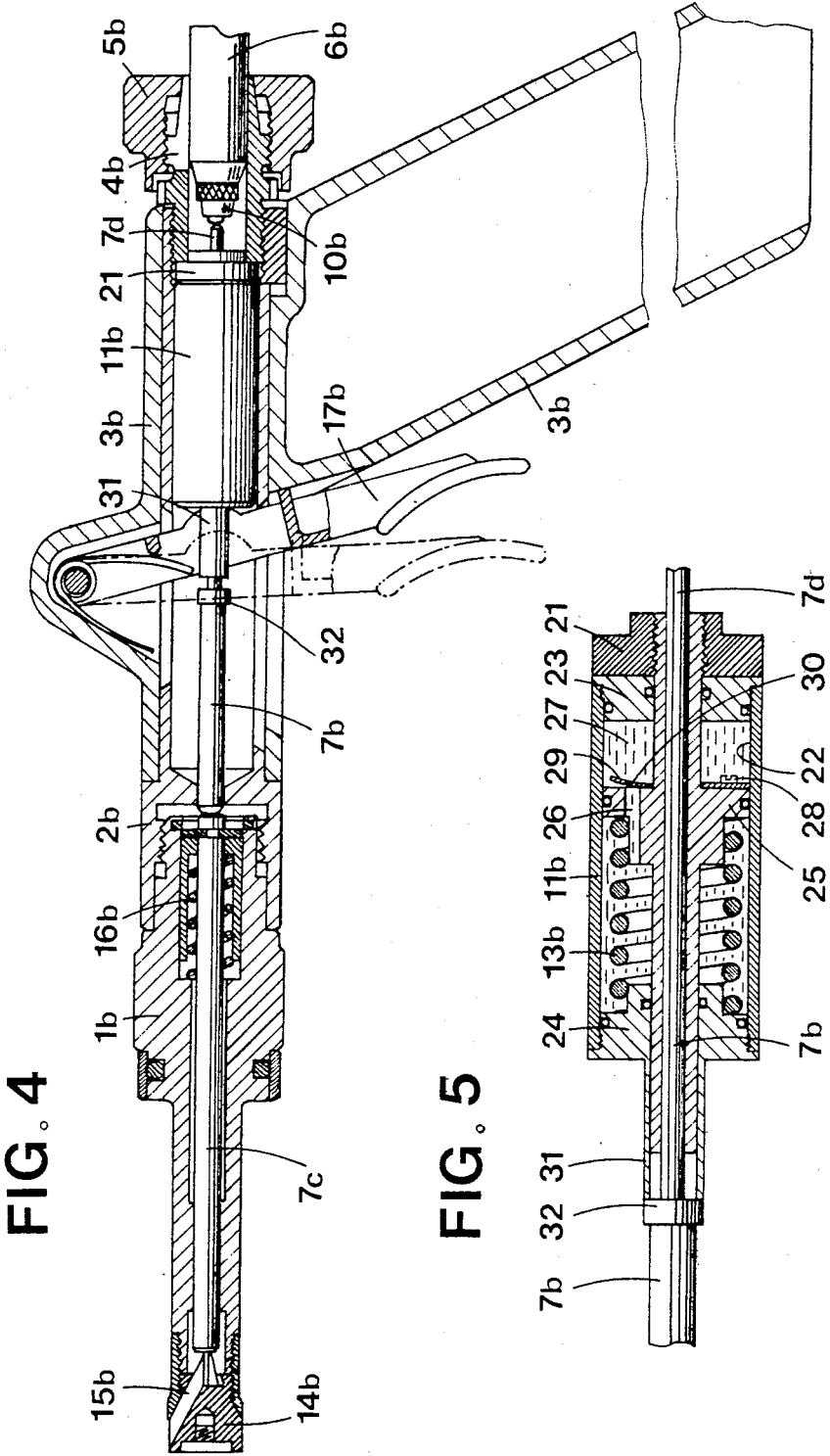
FIG. 4 is a longitudinal section of the second embodiment, showing the parts in the position with the measurement contacts retracted, the trigger being at the end of its working travel.
FIG. 5 is a section on a larger scale showing the arrangement of the brake.
Figure 6:
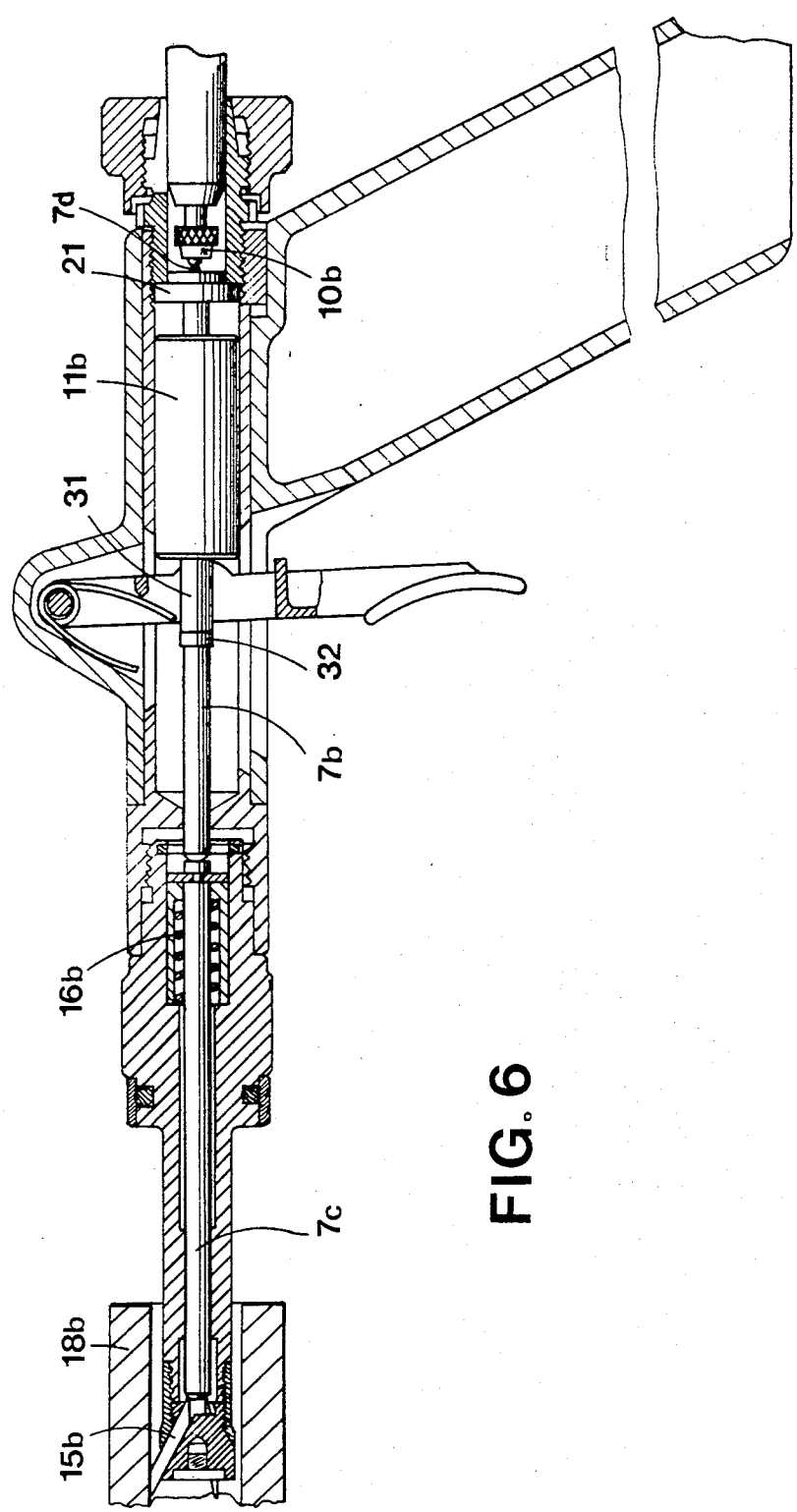
FIG. 6 is a view similar to FIG. 1 but showing the parts in the position which they occupy at the time of the measurement of a bore.

The embodiment in accordance with FIGS. 4,5 and 6 (wherein similar parts are identified by like numerals with the addition of the suffix b) aims at avoiding this defect whilst preserving the advantages of the construction in accordance with the first embodiment. The remedy to this defect consists in providing, preferably inside the part 11b, a brake, for example, a hydraulic brake which prevents abrupt displacement of the part 11a when the trigger is released, having previously been pulled right home.

The body of the instrument is formed of a part 1b, a part 2b attached to the part 1b and a grip 3b attached to the part 2b. At 4b is seen the split bush which serves to fix the rod 6b of the comparator onto the instrument. Again at 5b is seen the clamping nut of the split bush 4b. At 10b may be seen the feeler of the comparator.

At 17b is represented the trigger which serves for displacing towards the right the cylindrical thrust-piece 11b. In its extreme righthand position represented in FIG. 4 this piece 11b is resting against a fixed stop 21.

The part 11b is hollow and inside it is arranged an axial cylindrical chamber 22 closed in an oil-tight manner at its two ends by heads 23,24. Inside the chamber 22 is arranged a piston 25 screwed onto the part 21 and consequently fixed with respect to the body of the instrument. Hence the cylinder 22 is designed to slide axially on the fixed piston 25. The main spring 13b is arranged to bear against the piston 25 and to act against the head 24 of the part 11b. The piston is pierced by a passage (26) which serves to establish communication between the portions of the cylinder 22 located on opposite sides of the piston 25. The chamber 22 is entirely filled with a liquid such as oil, for example.

On the face of the piston 25 on the right in FIG. 5 is fixed by means of a screw 28 a small elastic plate 29 equipped with a hole 30 of much smaller area than the passage 26. This small plate 29 has two functions, on the one hand it serves as a valve for blocking the passage 26 almost completely when it rests against the piston, whilst letting the liquid pass practically without appreciable resistance from one side of the piston to the other when this small plate is curved towards the right and exposes this passage. The hole 30 serves as a dashpot when the small plate is resting against the piston.

The rod 7b and the rod 7c correspond functionally with the rod 7a of the first embodiment. The rod 7b passes freely but in an oil-tight manner through the piston 25 and the body 11b. It is by its end 7d that the rod 7b comes to act against the feeler 10b.

The operation of the instrument as shown is as follows.

Before proceeding to the measurement of a bore one acts upon the trigger 17b in order to bring it into its extreme working position shown in solid line in FIG. 4. In this position the feelers 15b are entirely retracted inside the measurement head 14b under the action of the spring 16b which is very appreciably weaker than the spring 13b for the reasons explained with reference to the first embodiment. Under the action of the trigger 17b the body 11b has come to occupy its extreme righthand position shown in FIG. 4. During the working travel of the trigger, passing from the position in dash/dot line to that shown in solid line in FIG. 4, with the trigger pushing against the head 24 and thus compelling the cylinder 11b to be displaced towards the right, the pressure increases in the portion of the chamber 22 located on the left of the piston. Under the effect of this increase in pressure the small plate 29 deforms as shown in FIG. 5 and lets the liquid pass through the passage 26 from the left towards the right. When the body 11b reaches the position shown in FIG. 4 and the trigger is released abruptly, the spring 13b urges the head 24 to move towards the left which immediately has the effect that the pressure drops in the left hand chamber and that under the effect of the higher pressure in the right-hand chamber the small plate 29 comes to be applied against the righthand end of the passage 26, blocking it except for the small passage consisting of the hole 30 which then acts as a dashpot, that is to say, as a hydraulic brake slowing down the motion of the body 11b under the action of the spring 13b. Consequently impact of the rod 7c against the feelers 15b can no longer be produced and the disadvantage indicated is eliminated.

In the position of the parts represented in FIG. 6 the feelers 15b are in contact with the bore of the part 18b, the body 11b is separated from the stop 21 and the spring 16b is acting against the feeler 10b by way of the rods 7c and 7b.

The position of the parts in accordance with FIG. 6 corresponds with that in FIG. 5 where a tube (31) integral with the head (24) is making contact with a collar (32) on the rod (7b), thus transmitting the thrust from the spring 13b to this rod. In the position of the parts represented in FIG. 4, the tube 31 is separated from the collar 32.

In a variant of the instrument which has just been described, the dashpot might be realised by the replacing of the hole 30 by a certain clearance between the piston 25 and the bore of the cylinder 11b. The operation would remain the same, the liquid passing through the passage 26 by deforming the small plate 29 when the cylinder 11b is displaced towards the right in FIG. 5 under the action of the trigger 17b, whilst it passes through the clearance between the piston 25 and the bore of the cylinder 11b when the latter is moved towards the left under the action of the spring 13b.

We claim:

1. A pistol-grip instrument for the measurement of inside diameters, of the type comprising a body provided with means of attachment for fitting a comparator onto this body, and comprising also a member which is movable axially in this body and one end of which is arranged to operate measurement feelers movable radially with respect to this member, whilst the other end of this member is designed to act upon the feeler of a comparator fitted to the said body, a main spring being arranged in this body in order to tend to act upon this member in the direction in which the member forces the measurement feelers to project from the body of the instrument, and a secondary spring weaker than the main spring, being arranged in the body in order to act in the opposite direction to the main spring in order to permit these measurement feelers to retract when the main spring is prevented from acting upon them, the instrument comprising in addition a trigger for acting upon this member in order to make the main spring cease from acting upon the measurement feelers, characterized in that the movable member includes at the place where the trigger enters into co-operation with it an operator rod intended for making contact at one end with the feeler of the comparator, and a thrust-piece mounted to slide on this rod, the main spring acting permanently at one end against this thrust-piece and bearing at its other end against a fixed portion of the body of the instrument, a stop being provided on the operator rod for limiting the displacement of the thrust-piece with respect to the operator rod under the action of the main spring, the trigger being arranged to act upon this thrust-piece against the action of the main spring in order to withdraw the measurement feelers of the instrument against the action of the main spring, the whole being in order that the force exerted by the operator rod upon the comparator can never exceed that from the secondary spring, whatever the force exerted upon the trigger.

2. An instrument as in claim 1, characterized in that it includes a brake means arranged for slowing down the motion of the thrust-piece under the action of the main spring when after having actuated the trigger one releases it abruptly.

3. An instrument as in claim 2, characterized in that the brake means is arranged inside the thrust-piece.

4. An instrument as in claim 3, characterized in that the brake means is a hydraulic brake comprising a piston fixed with respect to the body of the instrument and seated in a cylindrical chamber in the thrust-piece, this chamber being closed by heads at both ends thereof, the main spring being arranged between one of the heads of this chamber and the piston and a liquid filling the cylinder on opposite sides of the piston, a dashpot being provided in this piston for slowing down the displacement of the thrust-piece with respect to the piston under the action of the main spring.

5. An instrument as in claim 4, characterized in that the dashpot is formed by a hole in an elastic plate attached to the face of the piston remote from that against which the main spring acts, this plate unmasking a passage cut through the piston and of much larger area than the hole of the dashpot, when one acts upon the trigger, and the said plate acting as a valve against the portion of the piston where the said passage opens out, when one ceases from pressing the trigger.

* * * * *

UNITED STATES PATENT AND TRADEMARK OFFICE
CERTIFICATE OF CORRECTION

PATENT NO. : 4,385,446
DATED : May 31, 1983
INVENTOR(S) : CHARLES ROCH and LOUIS CHARLES GOLAY It is certified that error appears in the above-identified patent and that said Letters Patent is hereby corrected as shown below:

In the references cited, change "4,288,925" to --4,288,924--;

Column 1, line 32, change "presure" to --pressure--;

Column 3, line 15, change "2d" to --2a--;

Column 3, line 61, change "may be their" to --may by their--;

Column 4, line 9, change "11a" to --11b--.

Signed and Sealed this

Twenty-seventh Day of September 1983

[SEAL]

Attest:

Attesting Officer

GERALD J. MOSSINGHOFF

Commissioner of Patents and Trademarks